G. T. HORTON.

WATER TANK.

APPLICATION FILED JULY 5, 1919.

Reissued Dec. 23, 1919. 14,775.

Witness:
R. L. Darrington

Inventor,
George T. Horton.
By Marcus A. Hirschl
Atty.

UNITED STATES PATENT OFFICE.

GEORGE T. HORTON, OF CHICAGO, ILLINOIS.

WATER-TANK.

14,775. Specification of Reissued Letters Patent. Reissued Dec. 23, 1919.

Original No. 1,248,121, dated November 27, 1917, Serial No. 167,935, filed May 11, 1917. Application for reissue filed July 5, 1919. Serial No. 308,833.

*To all whom it may concern:*

Be it known that I, GEORGE T. HORTON, a citizen of the United States, residing in the city of Chicago, in the county of Cook and State of Illinois, have invented new and useful Improvements in Water-Tanks, of which the following is a specification.

This invention relates to improvements in water tanks and more especially to an improved tank gage or water gage to show at all times the height of water in the tank.

Where a water tank such as a watering tank for railroads is used in a cold climate, certain precautions must be adopted to prevent freezing of the water around the operative parts of the mechanism, which might interfere with their use, and accordingly in my prior United States Patent No. 1177704 of April 4, 1916, I have shown an improved type of railway watering tank embodying in its construction a heating chamber in the base of the tank structure, with a central smoke flue and additional heating flues extending up through the water in the tank, and the smoke flue projecting through the roof.

A tank embodying the general principles of construction of the tank shown in my said prior patent is illustrated in the accompanying drawings showing the use of my improved float gage in connection therewith, and the particular embodiment of such gage as herein illustrated has been designed more especially for use with a tank of such design and construction, although without departing from the spirit of the invention, the float gage may be used with other types of tanks, as will appear from the description hereinafter and from the claims.

A railway watering tank with my improved float gage used in connection therewith is illustrated in the accompanying drawings in which.

Figure 1:
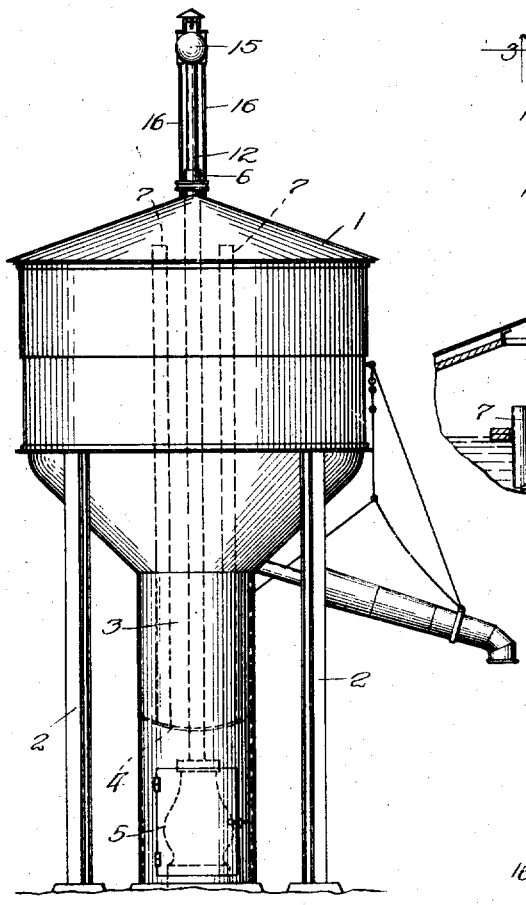
Figure 1 is a view in elevation, showing the complete tank.
Figure 2:
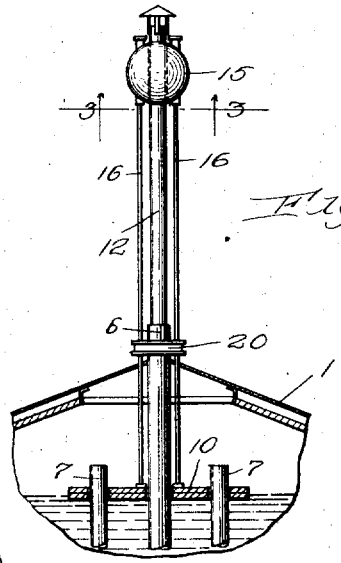
Fig. 2 is a view in axial section through the upper part of the tank, showing the complete float gage.
Figure 3:
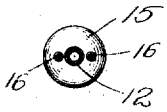
Fig. 3 is a horizontal section on the line 3—3 of Fig. 2, looking upward.

As shown in said drawings, the tank, 1, is set on supporting legs, 2, and joined at its bottom to a central water leg or cylinder, 3, which latter serves as an additional support for the bottom of the tank. Within the water leg 3, some distance above the ground is a false bottom or partition indicated in dotted outlines at 4, forming a heating chamber below the partition for a stove, 5. The stove is connected to a smoke flue, 6, which extends upward through the entire height of the tank and out above the roof; and in addition there are provided heating flues or tubes 7, 7, which are connected at their lower ends into openings in the partition 4 and extend upward through the water in the tank and nearly to the roof, so as to conduct warm air from the heating chamber in the base of the tank into the space above the water and beneath the roof. The general features of design and construction of such a tank are illustrated and described in my said prior patent, and except in combination with the additional parts herein shown and described, they are no part of the present invention.

Referring now to my improved float gage or water gage and related parts, 10 indicates a large float, which may be made of wood, having a circular opening through its center to receive the flue 6 and other openings corresponding to the positions of the heating flues 7, so that the float may slide up and down in the tank with variations in the depth of water, guided upon the flues 6 and 7.

Above the roof of the tank the center smoke flue 6 is extended upward by means of an additional length of tube or pipe, 12, and upon the tube 12 there is placed a large sliding ball, 15, which is connected to the float 10 by vertical rods, 16, 16, so that the up and down movemnt of the float is transmitted to the ball to indicate at all times the relative height of water in the tank. For the purpose of guiding the two rods 16 in their up and down movement, a collar 20 is fixed to the flue 6 immediately above the roof of the tank with openings in it through which the rods extend.

It will be seen therefore that in all positions of the float 10 it is in immediate proximity to the smoke flue 6 and the heating flues 7 and therefore in the warmest part of the water.

I claim as my invention:

1. The combination with a water tank, a heating device, and a flue extending upward through the tank and above the roof, of a float within the tank and in proximity to the flue, an indicator above the tank, and means connecting the float to the indicator to transmit the movement of the float to the indicator.

2. The combination with a water tank, a heating device, and a flue extending upward through the tank and above the roof, of a float within the tank and guided upon the flue, an indicator above the tank, and means connecting the float to the indicator to transmit the movement of the float to the indicator.

3. The combination with a water tank, a heating device and a flue extending upward through the tank and above the roof, of a float within the tank and surrounding the flue, an indicator above the tank having an opening through it and adapted to slide upon the flue above the tank, and a rod connecting the float to the indicator.

4. The combination with a water tank, a heating device, a smoke flue extending upward through the tank and above the roof and an additional heating flue extending upward through the water in the tank, of a float within the tank having openings through it adapting it to slide upon the flues, an indicator above the roof of the tank sliding upon the smoke flue, and a rod connecting the float to the indicator.

5. The combination with a water tank, a heating device, and a flue extending upward through the tank and above the roof, of a float within the tank and in proximity to the flue, an indicator above the tank, a support connecting the float to the indicator to transmit the movement of the float to the indicator, and means to guide the float and indicator.

6. The combination with a water tank, a heating device, and a flue extending upward through the tank and above the roof, of a float within the tank and in proximity to the flue, an indicator above the tank, a support connecting the float to the indicator to transmit the movement of the float to the indicator, and means to guide said support.

In witness whereof, I have hereunto subscribed my name this 25th day of June, 1919.

GEORGE T. HORTON.